(12) United States Patent
Hoffman

(10) Patent No.: US 7,040,209 B2
(45) Date of Patent: May 9, 2006

(54) TOOL FIXTURES FOR USE IN ROTATIONAL PROCESSING

(75) Inventor: Steve E. Hoffman, Englewood Cliffs, NJ (US)

(73) Assignee: Mikronite Technologies, Inc., Eatontown, NJ (US)

( * ) Notice: Subject to any disclaimer, the term of this patent is extended or adjusted under 35 U.S.C. 154(b) by 29 days.

(21) Appl. No.: 10/384,348

(22) Filed: Mar. 7, 2003

(65) Prior Publication Data

US 2003/0176150 A1   Sep. 18, 2003

Related U.S. Application Data

(63) Continuation-in-part of application No. 09/965,162, filed on Sep. 27, 2001.

(51) Int. Cl.
B26D 7/26 (2006.01)
B24B 31/33 (2006.01)

(52) U.S. Cl. .................. 83/668.41; 451/106; 451/328; 451/374

(58) Field of Classification Search .................. 451/32, 451/104, 106, 326, 327, 328, 329, 367, 370, 451/374, 236, 239, 237; 269/43, 254 CS; 241/236, 235; 83/668.41
See application file for complete search history.

(56) References Cited

U.S. PATENT DOCUMENTS

| | | | |
|---|---|---|---|
| 1,477,502 A * | 12/1923 | Killick | 241/236 |
| 1,512,350 A * | 10/1924 | McCorkle et al. | 451/113 |
| 1,654,649 A * | 1/1928 | Hildebrand | 451/196 |
| 2,311,762 A * | 2/1943 | Kottman et al. | 83/802 |
| 2,550,630 A | 4/1951 | Whitehead | |
| 2,589,782 A * | 3/1952 | Oliver | 451/106 |
| 2,709,325 A * | 5/1955 | Green et al. | 451/422 |
| 2,725,690 A * | 12/1955 | French | 451/273 |
| 2,774,194 A * | 12/1956 | Thatcher | 451/37 |
| 3,013,365 A * | 12/1961 | Ford | 451/32 |
| 3,027,105 A * | 3/1962 | Hall | 241/184 |
| 3,034,378 A | 5/1962 | Anderson | |
| 3,107,706 A | 10/1963 | Heinemann | |
| 3,145,510 A * | 8/1964 | Mayer et al. | 451/328 |
| 3,233,372 A | 2/1966 | Kobayashi | |
| 3,316,678 A * | 5/1967 | Jacob | 451/65 |
| 3,371,449 A | 3/1968 | Olson | |
| 3,513,604 A | 5/1970 | Matsunaga et al. | |
| 3,524,252 A * | 8/1970 | Dam et al. | 29/604 |
| 3,679,517 A * | 7/1972 | Schulten et al. | 156/345.23 |
| 3,746,267 A * | 7/1973 | Myers et al. | 241/46.11 |
| 4,073,095 A | 2/1978 | Dreher | |

(Continued)

Primary Examiner—Allan N. Shoap
Assistant Examiner—Ghassem Alie
(74) Attorney, Agent, or Firm—Drinker Biddle & Reath LLP

(57) ABSTRACT

A fixture for holding tools to be processed in a rotational processing apparatus. The fixture includes at least one mounting rod with a plurality of spacers slidably disposed on the mounting rod. A plurality of tools are disposed about the rod, each tool being spaced from an adjacent tool by one of the spacers. A removable attachment is provided on at least one end of the rod for inhibiting the spacers from sliding off the rod. The fixture may also include first and second end plates mounted to the rod on either side of the products being finished. One or more springs may also me incorporated onto the rod between a spacer and the first or second end plates. A process for loading and using the fixture is also disclosed.

10 Claims, 9 Drawing Sheets

U.S. PATENT DOCUMENTS

| | | | |
|---|---|---|---|
| 4,280,302 A * | 7/1981 | Ohno | 451/36 |
| 4,580,371 A * | 4/1986 | Akhavi | 451/32 |
| 4,586,292 A | 5/1986 | Carroll et al. | |
| 4,796,388 A * | 1/1989 | Steckis | 451/328 |
| 4,967,514 A | 11/1990 | Kunz | |
| 5,140,783 A | 8/1992 | Hoffman | |
| 5,236,548 A * | 8/1993 | Stadler et al. | 216/91 |
| 5,271,184 A * | 12/1993 | Majors | 451/113 |
| 5,276,998 A * | 1/1994 | Joen et al. | 451/35 |
| 5,279,074 A * | 1/1994 | Davidson | 451/326 |
| 5,295,330 A | 3/1994 | Hoffman | |
| 5,355,638 A * | 10/1994 | Hoffman | 451/32 |
| 5,454,749 A | 10/1995 | Ohno | |
| 5,507,685 A | 4/1996 | Hoffman | |
| 5,518,439 A * | 5/1996 | Lambertus | 451/45 |
| 5,672,094 A * | 9/1997 | Nishimura et al. | 451/32 |
| 5,727,582 A * | 3/1998 | Terui | 134/140 |
| 5,848,929 A * | 12/1998 | Hoffman | 451/32 |
| 6,035,844 A | 3/2000 | Otani et al. | |
| 6,067,888 A | 5/2000 | Achterberg et al. | |
| 6,270,398 B1 * | 8/2001 | Liao | 451/326 |
| 6,293,020 B1 | 9/2001 | Julien | |
| 6,443,182 B1 * | 9/2002 | Hathcock | 137/514.5 |
| 6,688,952 B1 | 2/2004 | Bagdasarian | |
| 6,758,729 B1 * | 7/2004 | Fujishiro | 451/328 |
| 6,764,384 B1 * | 7/2004 | Kleer et al. | 451/32 |

\* cited by examiner

TOOL FIXTURES FOR USE IN ROTATIONAL PROCESSING

RELATED APPLICATIONS

This application is a continuation-in-part of pending U.S. patent application Ser. No. 09/965,162, filed Sep. 27, 2001, entitled "Saw Blade," and PCT Application Serial No. PCT/US02/03272, filed Feb. 5, 2002, entitled "Improved Tool and Method of Making," the disclosures of both applications are incorporated herein by reference in their entirety.

FIELD OF THE INVENTION

The present invention relates to fixtures for holding tools to be processed and, more particularly, to fixtures for holding and protecting a plurality of tools during a rotational finishing operation.

BACKGROUND

In recent years rotational finishing operations have been used more and more to provide structural and cosmetic changes to the surface of products. During a rotational finishing operation, the products being finished are typically placed in a barrel or container with a processing media, such as an abrasive, and the container is rotated about its axis and/or a secondary axis. The rotational motion of the container causes the media to contact the surface of the product, producing finishing.

U.S. Pat. Nos. 5,140,783, 5,355,638 and 5,848,929 describe high speed rotational processors that are particularly useful for finishing a wide variety of products. The apparatus disclosed in these patents are adapted to subject a product being finished to significantly high accelerations, e.g., 20 g's or more. These high accelerations, generate a significant amount of energy that the media applies to the surface of the products. The result is a change in both the structural and cosmetic appearance of the surface of the product.

The products being finished are typically placed in the container prior to or after the media is introduced. While many products can be rotated or tumbled without concern for the product hitting the walls of the container, some products, such as cutting tools including drill bits, saw blades and the like, have edges that may become damaged if they contact the container walls, especially when the containers are operating at the high speeds described in U.S. Pat. Nos. 5,140,783, 5,355,638 and 5,848,929.

Also, if more than one part is placed within a vessel at a time, there is a chance that the products can contact one another and cause damage. Additionally, some products have a tendency to nest with one another (i.e., product-to-product contact) during rotational processing as opposed to staying spaced apart in the media. Nesting prevents the media from sufficiently contacting the surface of the products, thereby resulting in a deficient end product.

A need exists for a fixture which is capable of holding a tool or other product to be processed, and which can protect the product from contacting the walls of a container, while still permitting the product to be completely contacted by the finishing media.

SUMMARY OF THE INVENTION

The present invention relates to a fixture for holding tools to be processed in a rotational processing apparatus. The fixture includes at least one mounting rod with a plurality of spacers slidably disposed on the mounting rod. A plurality of tools are disposed about the rod, each tool being spaced from an adjacent tool by one of the spacers. A removable attachment is provided on at least one end of the rod for inhibiting the spacers from sliding off the rod.

In one embodiment, first and second end plates are mounted to the rod on either side of the products being finished. The mounting rod extends between the end plates. One or more springs may also me incorporated onto the rod between a spacer and the first or second end plates.

A process for loading and using the fixture is also disclosed.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE PREFERRED EMBODIMENTS

Figure 1:
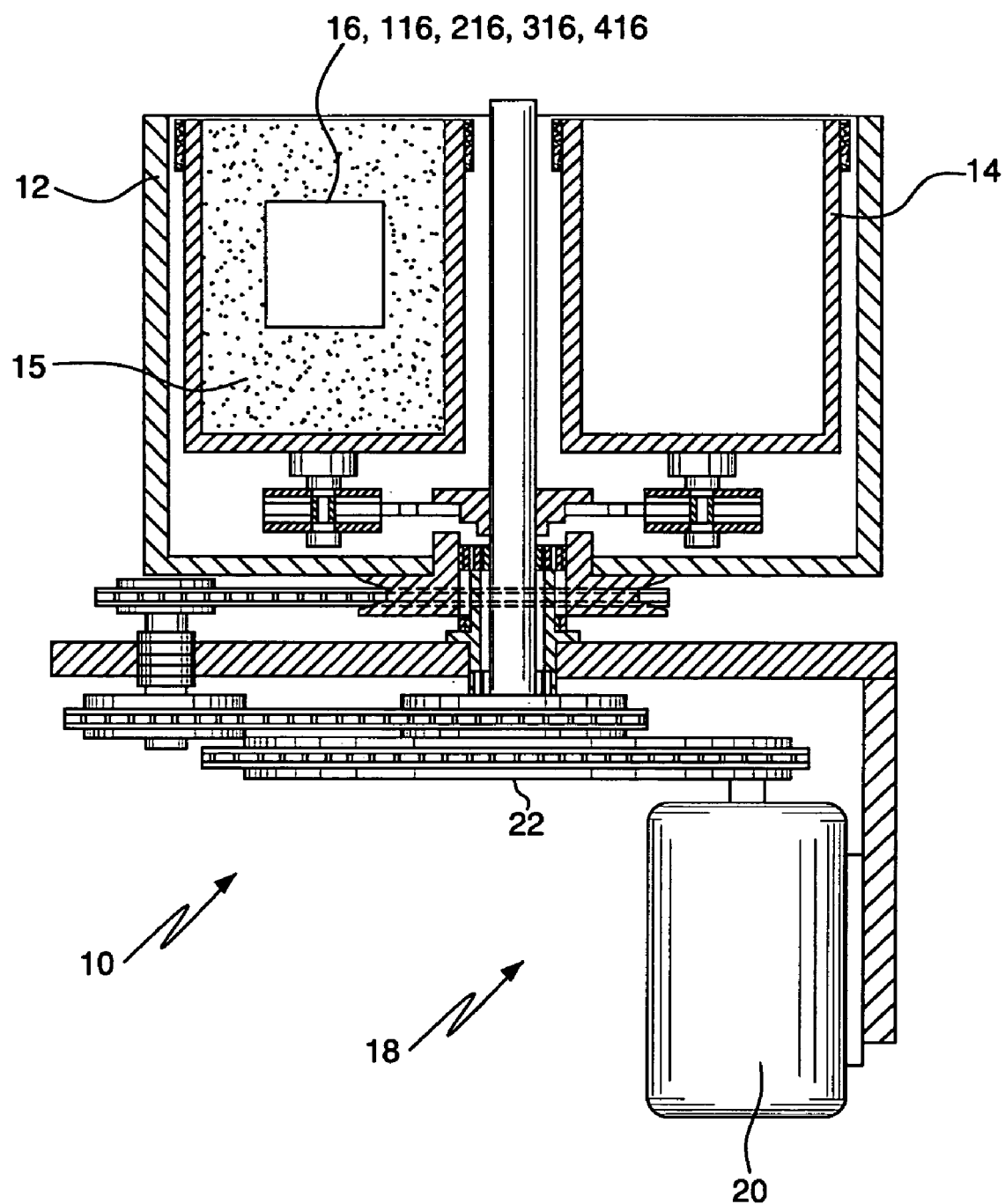
FIG. 1 is a cross-sectional view of a rotational processor within which the fixtures of the present invention may be placed for finishing products.

For the purpose of illustrating the invention, there is shown in the drawings one or more embodiments of the invention which are presently preferred; it being understood, however, that this invention is not limited to the precise arrangements and instrumentalities shown.

FIG. 1 illustrates one form of rotational processor within which the fixtures of the present invention may be placed for finishing products. A variety of rotational processors (and associated processes) for which the present invention has particular use are disclosed in U.S. Pat. Nos. 5,140,783, 5,355,638 and 4,848,929, the disclosures of which are incorporated herein by reference in their entirety. Additional suitable rotational processors are described in co-pending U.S. patent application Ser. No. 09/965,270, entitled High Speed Centrifugal Processor, and U.S. patent application Ser. No. 10/326,674, entitled Horizontal Finishing Machine, the disclosures of which are incorporated herein by reference in their entirety. The rotational processors described in these patents and patent applications are available from Mikronite Technologies, Inc., Carlstadt, N.J.

The processor 10 shown in FIG. 1 is one embodiment of a device which can be used to process the products being finished. The illustrated embodiment is for exemplary purposes only. Those skilled in the art would be readily capable of applying other devices for finishing the tools using the inventive fixtures in light of the teachings provided herein. The processor 10 includes an outer vessel 12 and one or more inner vessels 14. The inner vessels 14 are preferably removably mounted within the outer vessel 12. Each inner vessel 14 is adapted to contain one or more fixtures 16 that hold and secure the products that are to be subjected to a finishing process.

The inner vessel 14 is mounted to a drive system 18 which includes a motor 20 and a transmission or gearbox 22. In the illustrated variation of the drive system 18 shown in FIG. 1, the gearbox 22 includes a plurality of gears or pulleys which are engaged with the inner and/or outer vessel as described in the above referenced patents. While one embodiment of the drive system is illustrated, any conventional drive system can be used in the present invention.

The drive system 18 is adapted to rotate the inner vessels 14 around the inside periphery of the outer vessel 12 (which happens to be around the outer vessel's central axis when the outer vessel is cylindrical as shown in FIG. 1.) As discussed in more detail in U.S. Pat. No. 5,355,638, the mounting of each inner vessel 14 to the drive system 18 is such that the inner vessel 14 can rotate about its own central axis while concomitantly being driven around the inner surface of the outer vessel 12.

A controller (not shown), such as a signal processor, electronic or digital controller or other type of motor control, is used to control the speed and direction of rotation of the motor and/or control the engagement, shifting or disengagement of the gearbox. Controllers are well known to those skilled in the art and, therefore, no further discussion is needed.

The details of how the inner vessel 14 is driven with respect to the outer vessel 12 are provided in the above referenced patents and co-pending applications, thus no further discussion is needed.

Figure 2:
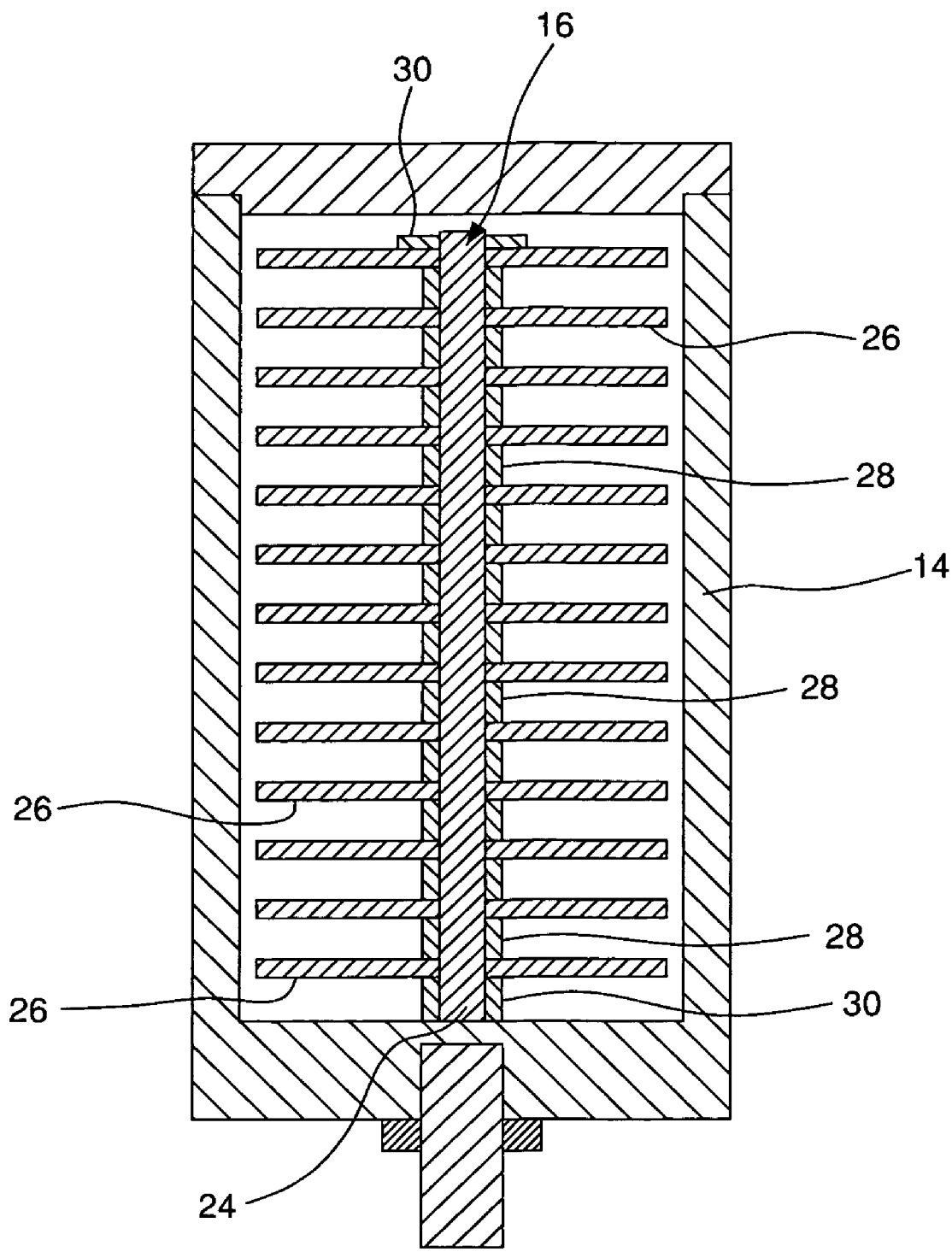
FIG. 2 illustrates an cross-sectional view of a fixture according to one embodiment of the invention fixedly attached to an inner vessel.

In order to maximize the number of products being processed while minimizing the likelihood of damage to the products, one or more fixtures 16 are located within the inner vessels. A first embodiment of a fixture 16 according to the present invention is shown in FIG. 2. This fixture 16 is particularly suited for mounting and securing circular items that are to be processed within one of the inner vessels. One such circular item is a circular saw blade. In this embodiment, the fixture 16 includes a central rod 24. A plurality of products 26, such as saw blades, are mounted on the rod 24 through mounting holes in the products. The products 26 are spaced apart by spacers 28. The length of the spacers 28 must be long enough to leave a sufficient gap between adjacent products 26 to permit the finishing media that is used in the process to pass between and act upon the sides of the products 26 during operation. In one embodiment, the rod 24 is made from cold-rolled drill stock with a diameter of between 9/16 inch to about 19/32 inch.

A nut or similar fastener 30 is attached to at least one end of the rod 24 to prevent the products 26 and the spacers 28 from sliding off the rod 24. As shown in FIG. 2, the rod may be fixedly attached to the inner vessel 14. The size of the inner vessel 14 and/or the fixture 16 would be selected such that the walls of the inner vessel 14 are spaced apart from the tips or edges of the products 26 to prevent any damage to the products.

Figure 3:
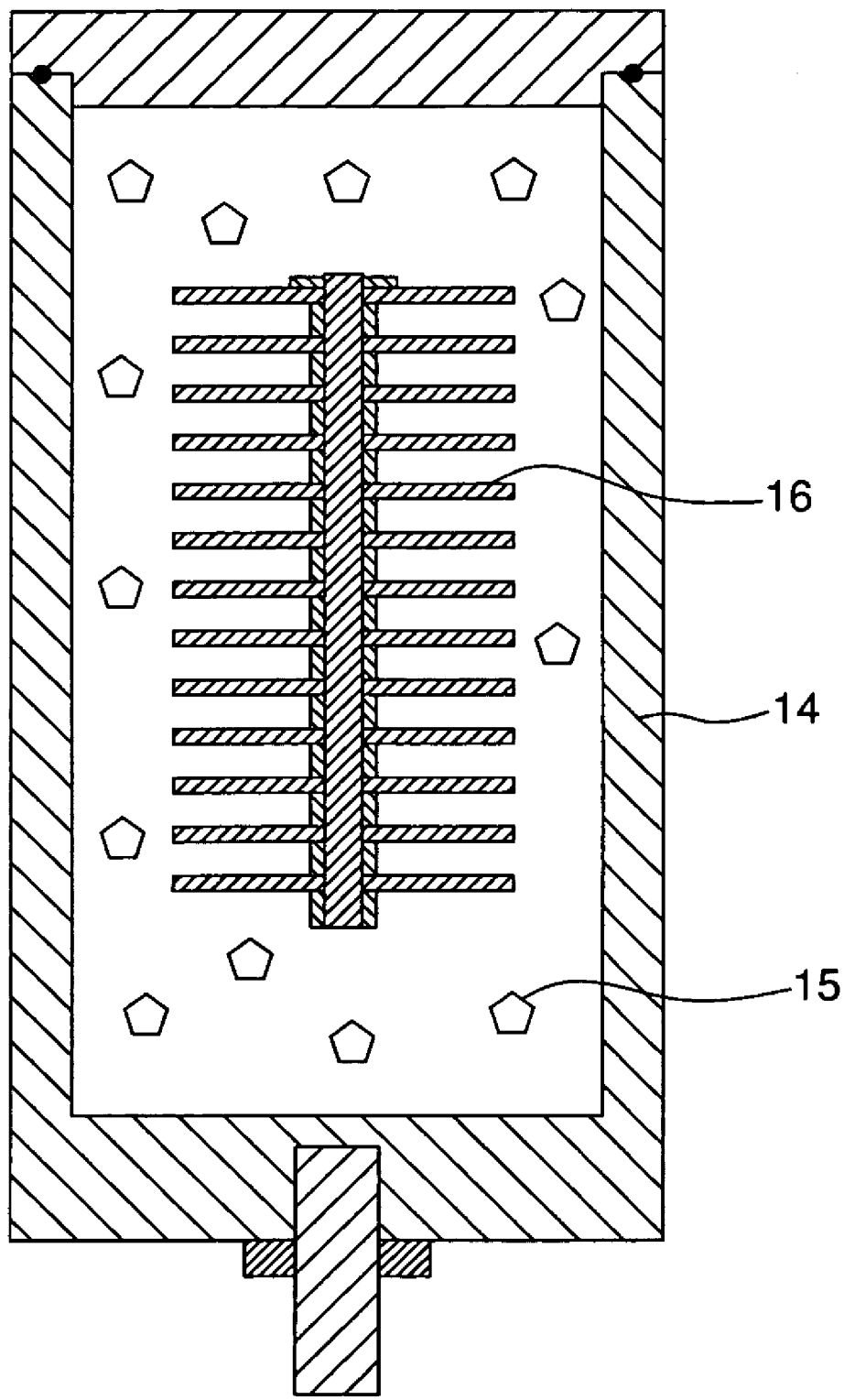
FIG. 3 is a cross-sectional view of a fixture according to one embodiment of the invention floating freely within an inner vessel.

Alternately, as shown in FIG. 3, the fixture 16 may be free to move about the vessel 14. More particularly, since the machines shown and described in the above-referenced patents and applications are designed, in some operations, to produce an even concentric motion within the vessel 14, fixtures 16 placed within the vessel 14 should stay essentially centered within the vessel 14 during operation. The chances of contact with the vessel walls are generally limited to start-up and shut-down of the processing operation. At those times, the loading on the fixture 16 caused by the rotational motion will be well less than during normal operation. Accordingly, the chances are less of damage to the products 26 should they contact the walls. Hence, allowing the fixture 16 to float within a mass of abrasive material or media 15, as shown in FIG. 3 is completely within the scope of the invention.

Since the fixture will have a greater inertial resistance than the finishing media (i.e., its' relative velocity is slower than the media), the media will not only contact the tools by cascading into it (mimicking the effect of shot peening), but will also slide along the various faces of the tool (mimicking the effect of polishing or lapping).

Figure 4:
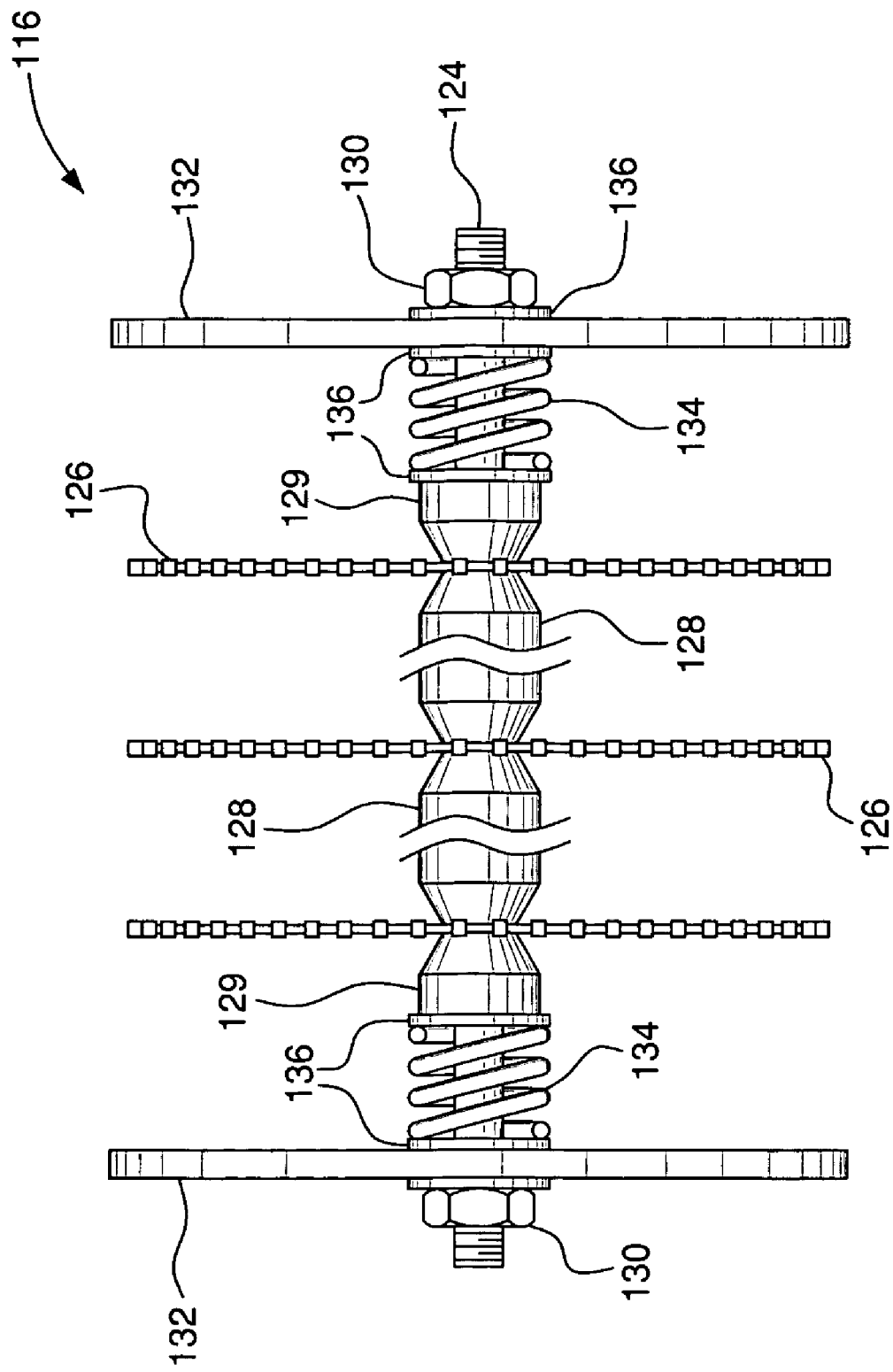
FIG. 4 is a cross-sectional view of a fixture according to a second embodiment of the invention.
Figure 5:
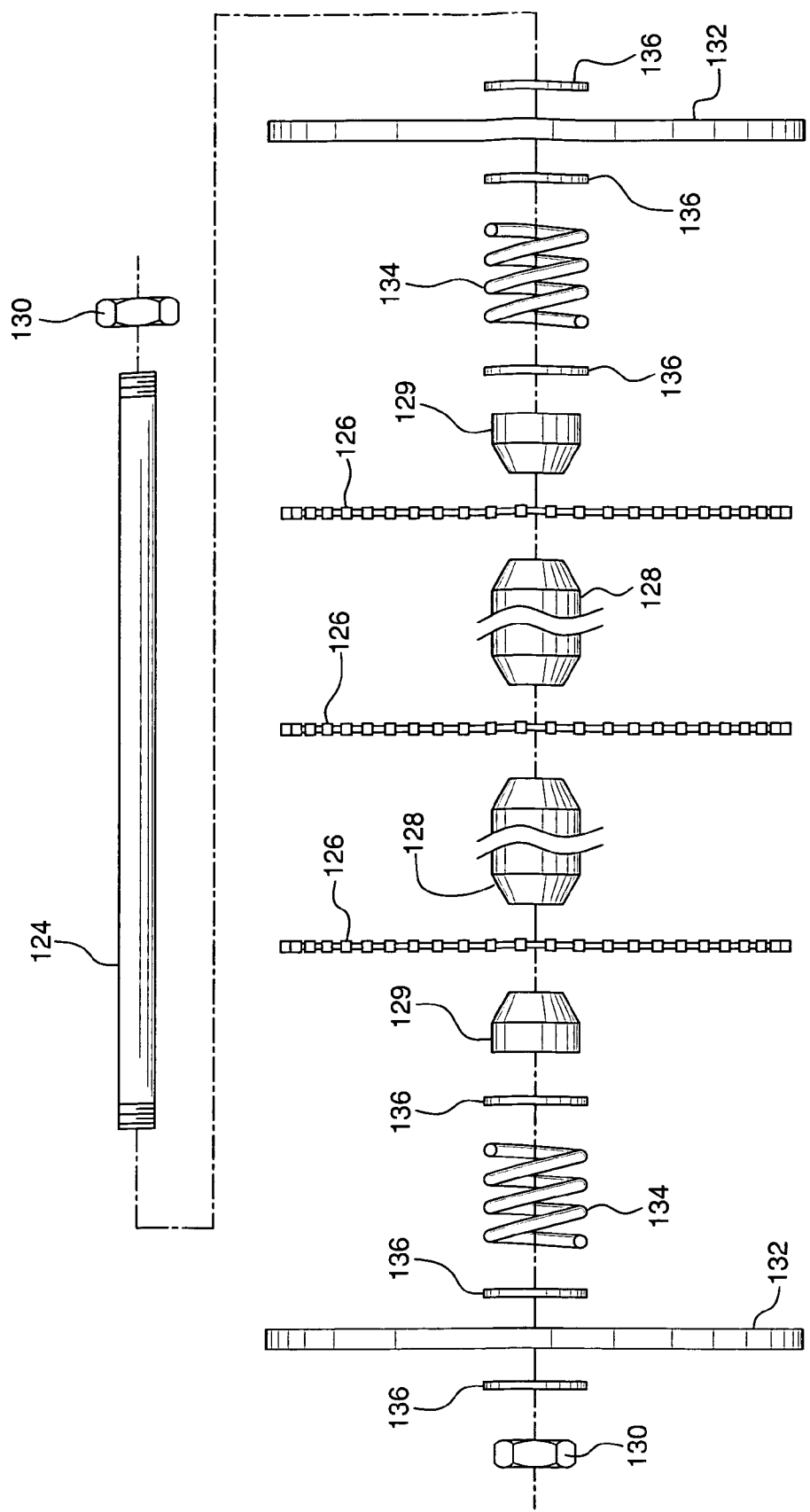
FIG. 5 is an exploded view of the fixture of FIG. 4.

Referring now to FIGS. 4 and 5, a second, more preferred, embodiment of a fixture 116 is illustrated for securely retaining a circular product to be finished. In this embodiment, the fixture 116 again includes a central rod 124. A plurality of saw blades or other circular products 126 are mounted on the rod 124 through their center mounting holes.

The products 126 are again spaced apart by spacers 128 a sufficient amount to permit the finishing media to pass between and act upon the sides of the product 126 during operation. The spacers 128 in this embodiment are preferably tapered at their axial ends. This minimizes the amount of surface that the spacers contact on the product 126 being finished, thereby maximizing the surface finishing of the product 126. In one embodiment suitable for finishing saw blades, the spacers 128 have a maximum outer diameter of approximately 1.25 inches and a 60 degree taper down to a diameter of approximately 0.75 inches. The spacers 128 also have a through-hole for permitting the spacer to slide onto the rod 124. The hole is approximately 0.625 inches. This results in a land or contact surface of only approximately 0.0625 in width. The length of the spacers 128 in this configuration is approximately 2 inches.

The spacers 128 are preferably made from a material that can withstand the anticipated loads from the media abrasive that the spacers 128 are likely to be exposed too. Alternatively, the spacers 128 can be made from an inexpensive material such that the spacers 128 can be replaced as they begin to wear. In one embodiment, the spacers 28 are made from ultra-high molecular weight polyethylene. Those skilled in the art would be readily capable of selecting a suitable spacer material and to alter the dimensions discussed above based on the anticipated products being finished and the likely loading.

End spacers 129 are preferably used on the opposite ends of the stack of products being finished. The end spacers 129 are tapered on one side and flat on the other side.

The ends of the fixture 116 include end plates 132 which are also mounted to the rod 124. The end plates 132 preferably have a diameter which is the same as or, more preferably, larger than the diameter of the products 126 mounted to the fixture 116. As such, the end plates 132 function to protect the products mounted on the rod 124 from contacting the walls of the vessel 14. The end plates 132 are preferably constructed so as to withstand the forces likely to be imposed on the fixture 116 during operation. In one configuration for use in finishing 7¼ inch saw blades, the end plates 124 are made from polyurethane material with a 95A durometer. The end plates preferably have a diameter of approximately 9 inches and a thickness of approximately ⅜ inches.

A nut or similar fastener 130 is attached to at least one end of the rod 124 to prevent the products, frame walls, and spacers from sliding off the rod 124. The opposite end of the rod 124 may include a head (not shown) which is larger than the hole in the end plate 132, thus preventing the rod 124 from sliding through. In such an embodiment, only one fastener 130 is needed on the opposite side to secure the assembly together. Alternatively, as shown in the FIGS. 4 and 5, two fasteners may be used at opposite ends of the rod.

A spring, such as compression spring, or similar biasing member 134, is located between at least one end spacer 129 and an end plate 132. The spring 134 is designed to bias the spacers 128, 129 into contact with the products being finished. More preferably, at least two springs 134 are used, one at either end of the stack of products as shown in FIGS. 4 and 5.

Any suitable spring 134 can be used which provides a desired degree of resilience. It should be readily apparent that the tightening of the fasteners 130 increases the spring force acting on the products, thus, altering the biasing provided by the springs 134. For a fixture used to secure saw blades, a range of compression that has been found to be acceptable is between approximately 25 and 30 lbs. of compression. As with the spacers 128, 129, the springs 134 are preferably selected so as to withstand the anticipated loads and abrasion from the media. For a fixture used to hold saw blades, it has been determined that a preferable spring is a constant tension or die spring. Constant tension springs are designed to maintain a constant amount of tension or compression under load. Other types of springs can be used in the present invention and may vary depending on the type of processing/finishing that the product is undergoing. Those skilled in the art would be readily capable of selecting appropriate springs in light of the teachings provided herein.

Washers 136 are preferably located between the ends of the springs 134 and the frame wall 132 and end spacer 129, as well as between the nut 130 and the frame wall 132.

Figure 6:
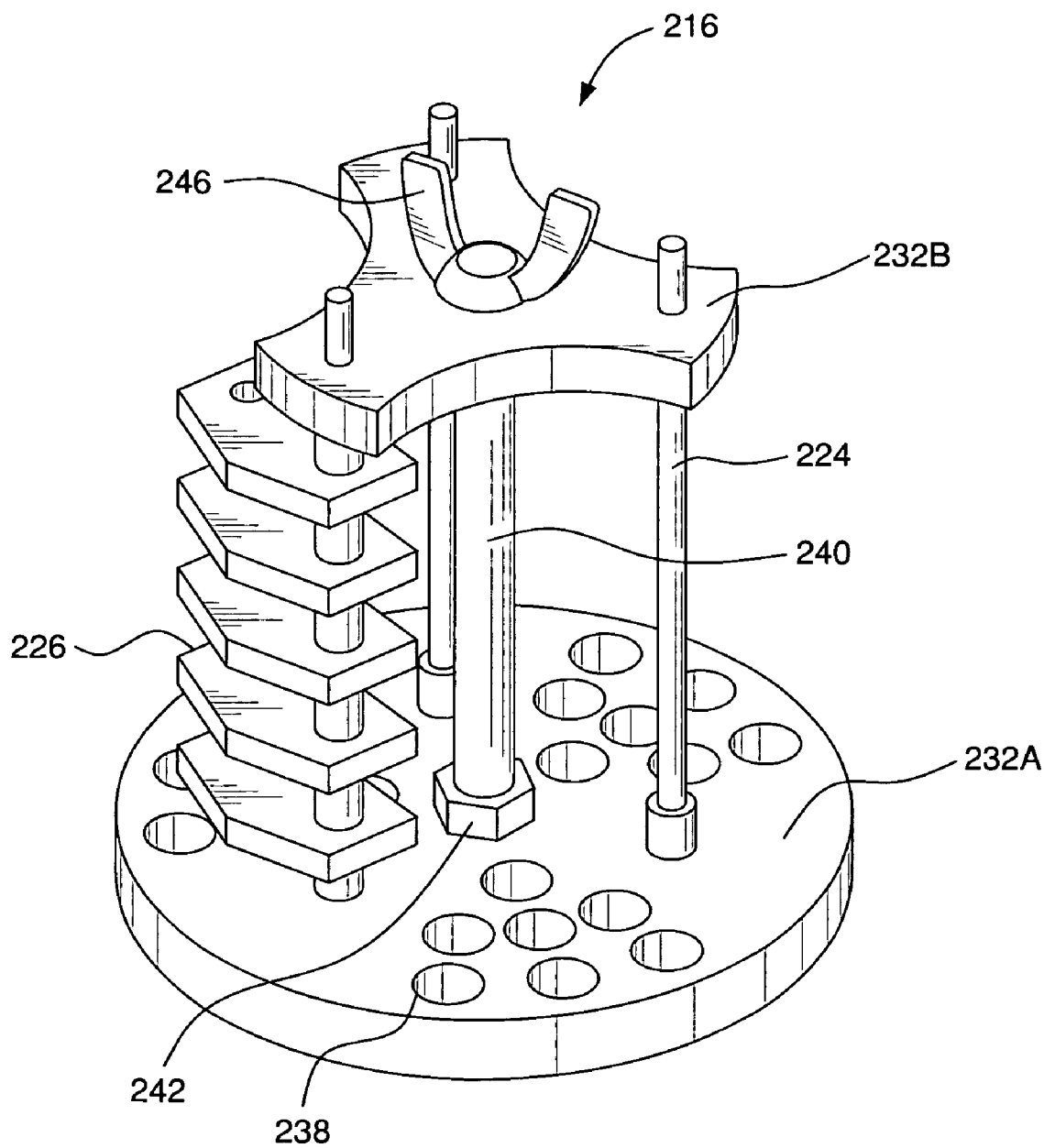
FIG. 6 is a view of a fixture according to a third embodiment of the invention.
Figure 7:
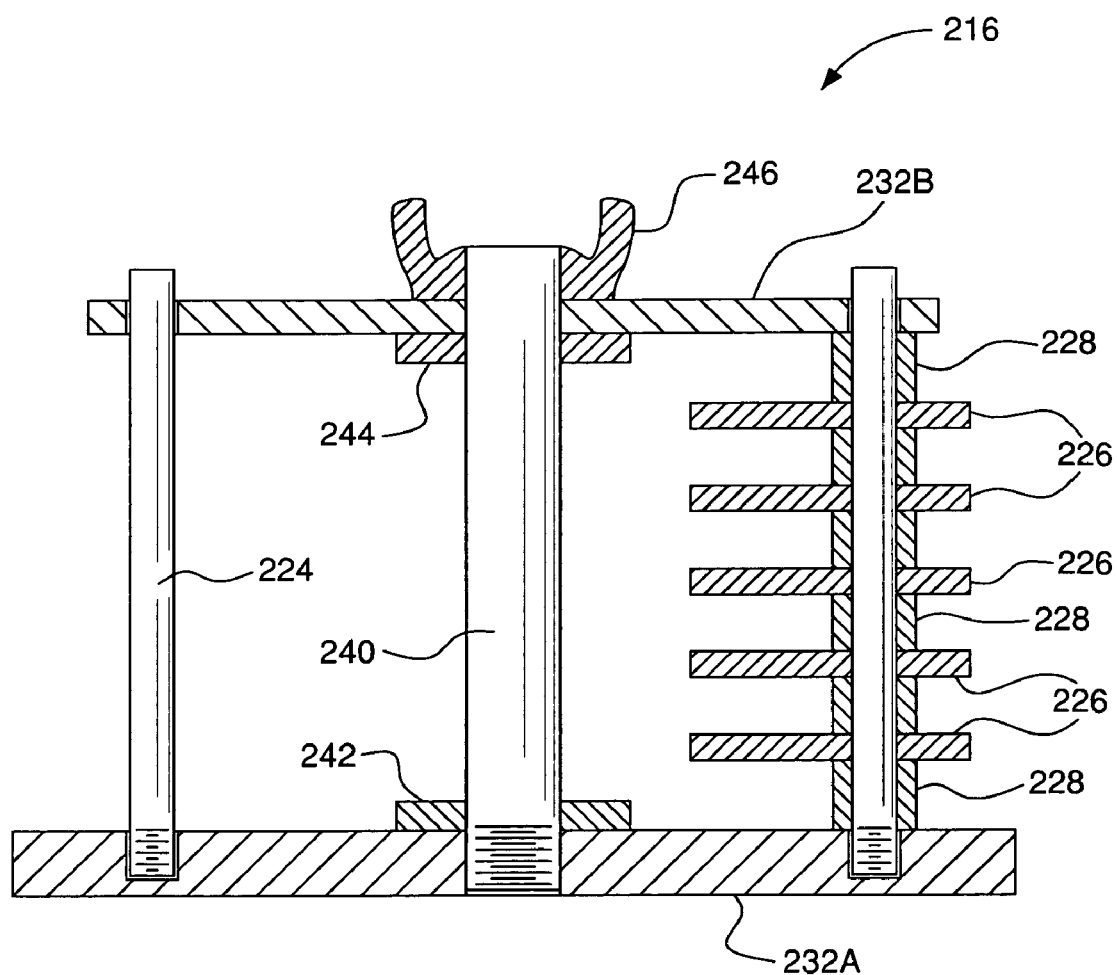
FIG. 7 is a section view of the fixture of FIG. 6.

Referring now FIGS. 6 and 7, a third embodiment of a fixture 216 is shown. This fixture 216 is particularly useful for holding a plurality of tools 226, such as tool bits including drill bits, inserts or similar small cutting bits, which are to be subjected to a rotational finishing and/or processing operation. In this embodiment, the fixture 216 includes two end plates 232 with one or more mounting rods 224 extending between the end plates 232. In the illustrated configuration, there are three mounting rods 224 spaced equally around the end plates 232. While three equally spaced mounting rods 224 are shown, any suitable number and type of spacing can be used depending on the products being finished. It is, however, desirable to arrange the fixture such that during operation it is balanced.

In the illustrated embodiment, the end plates 232 are shown as having different shapes. One end plate 232A is circular with a plurality of holes 238 formed in it. The holes provide lightening for the plate 232A. The second end plate 232B is substantially Y-shaped so as to provide flanges through which the ends of the mounting rods 224 extend. It is, however, contemplated that the plates could be similarly shaped as in the prior embodiment. One benefit to the configuration shown in the illustrated embodiment is that the larger base or first end plate 232B results in a lower center of gravity of the entire fixture, thus tending to inhibit or reduce tipping of the fixture during operation.

As shown in the figure, the first (and/or second) end plate may include one or more holes or openings. The holes/openings provide three benefits. First, the holes assist in lightening the plates. Second the holes permit media to pass through so that the fixtures can be pushed deeper into a vessel. Lastly, the holes also permit the media to pass through and contact the face of the parts adjacent to the holes, thereby enhancing media flow. The holes can be tailored to provide directional control over the media if desired.

In one embodiment, the base plate 232A is preferably made from steel with a polyurethane coatings, has a four inch diameter and is ⅜ inches thick. The upper end plate 232B is preferably made from polyurethane material and has a thickness sufficient to maintain rigidity.

The end plates 232 are preferably spaced apart from one another by a central rod 240. The central rod 240 is bolted or otherwise attached to the two plates. As shown in the illustrated embodiment of FIG. 6, the central bolt is preferably threaded into and secured to the first or base plate 232A. A bolt 242 inhibits movement of the central rod 240 relative to the base plate 232A. The upper end of central rod 240 preferably extends through a central hole formed in the upper plate 232B. A bolt 244 and wing-nut 246 are used to secure the central rod 240 to the upper plate 232B. As should be readily apparent, the central rod, in combination with the nuts 242, 244 and wing-nut 246, space the plates 232 apart from one another. In one embodiment, the central rod 240 is made from mild steel and has a diameter of approximately 0.25 inches. However, a variety of other types of materials and sizes can be used in the present invention.

The mounting rods 224 are preferably threaded into the base plate 232A and extend up through holes formed in the upper plate 234B. However, those skilled in the art will appreciate that there are numerous methods of attaching the mounting rods 224 to the plates 232 and, thus, the illustrated configuration is only exemplary. In one configuration, the mounting rods 224 are made from hardened steel and have a diameter of approximately 0.86 inches. Other material, sizes and shapes can be used depending on the products being finished and the stiffness desired. The mounting rods 224 are preferably spaced apart from the central rod 240 by a sufficient distance to prevent the products from contacting the central rod 240. In the illustrated embodiment, the mounting rods 224 are spaced one inch from the central rod 240.

Referring to FIG. 7, the products 226 that are to be finished are mounted to mounting rods 224 through holes formed in the products 226. Spacers 228, such as plastic tubing, are used to maintain the products 226 spaced apart from one another. The length of the spacer 228 is selected to maintain a sufficient gap between adjacent products 226. In one embodiment of the invention, the spacers are made from polyethylene material and are between ¼ and ½ inch long. In this embodiment, the spacers have an inner diameter that is slightly larger than the diameter of the mounting rods (i.e., approximately 0.125 inches) and an outer diameter of between 0.125 and ¼ inches. While polyethylene was utilized one embodiment, other materials can be used, such as metal, foam or other forms of plastic. Preferably the spacer is made from a material that is softer than the product being finished.

Figure 8:
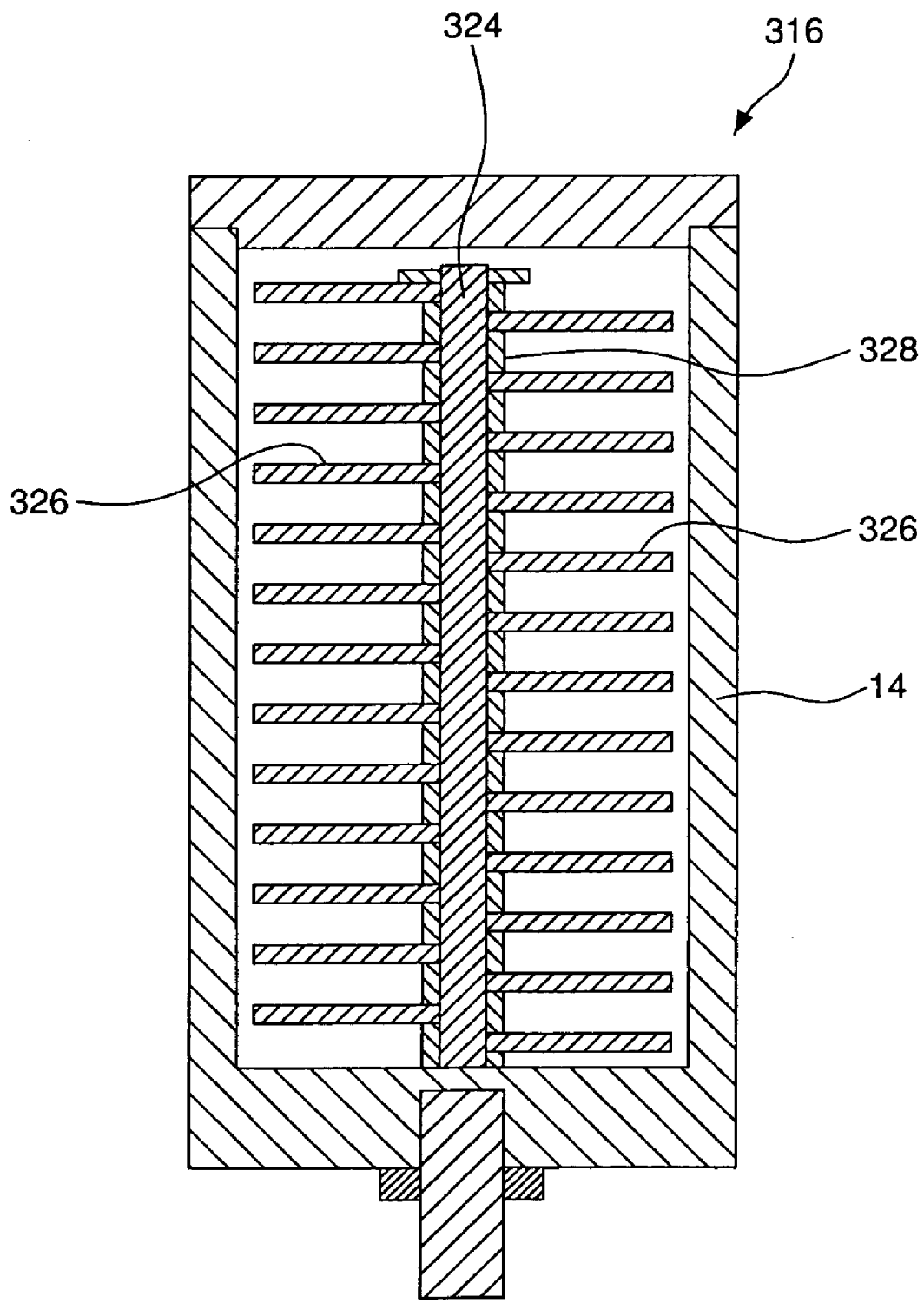
FIG. 8 is a cross-sectional view of a fixture according to a fourth embodiment of the invention.
Figure 9:
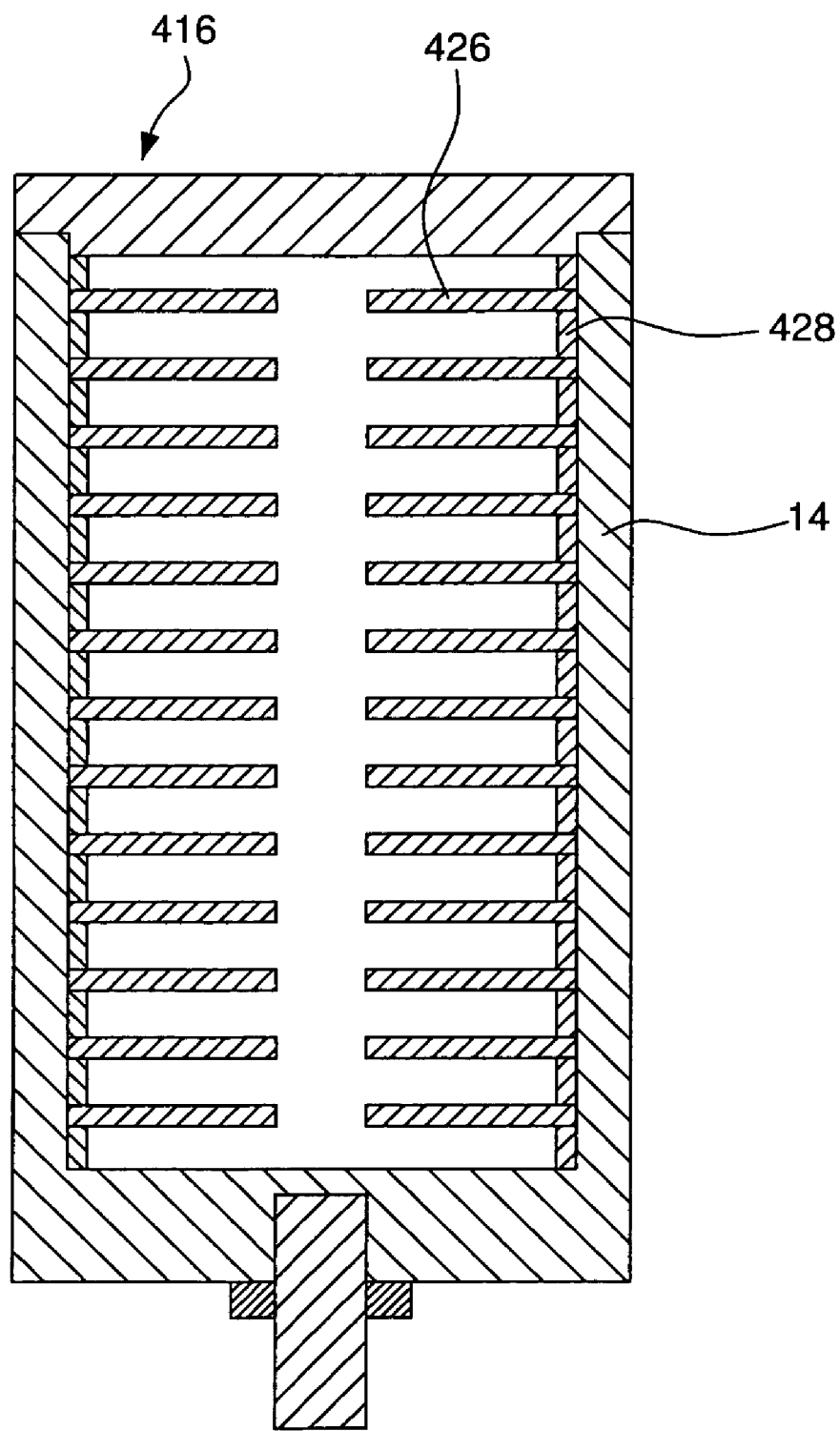
FIG. 9 is a cross-sectional view of a fixture according to a fifth embodiment of the invention.

FIGS. 8 and 9 illustrate alternate mounting configurations for fixtures. More particularly, FIG. 8 illustrates a fixture arrangement 316 similar to the one shown in FIG. 2. However in this embodiment, the products 326 are not circular but may, instead have various shapes. For example, the products 326 may be drill bits with the shank of the bit mounted to the rod 324 between the spacers 328. The arrangement of the products 326 could be staggered as shown.

FIG. 9 is similar to FIG. 8, except that the fixture 416 in this embodiment is mounted or disposed against the inside of the vessel 14 and the products 426 being finished project radially inward. Spacers 428 separate the products 426 as in the previous embodiments.

The above fixtures are exemplary of the various types of fixtures that may be used for holding products during a rotational finishing or processing operation. Although the invention has been described and illustrated with respect to these exemplary embodiments, it would be understood by those skilled in the art, in light of the teachings provided herein, that the foregoing and various other changes, omissions and additions may be made therein and thereto, without parting from the spirit and scope of the present invention.

What is claimed is:

1. A fixture for holding tools to be processed in a rotational processing apparatus having a vessel and a drive system capable of simultaneously rotating the vessel about two separate axes of rotation, which processing is designed to finish the surface of the tools, the fixture comprising:
    at least one mounting rod having first and second ends;
    a plurality of spacers slidably disposed on the mounting rod;
    a plurality of tools removably disposed about the rod, each tool being spaced from an adjacent tool by one of the spacers;
    first and second end plates, the end plates having a radial dimension that is at least the same as a radial dimension of the tools so that the tools do not protrude radially past the end plates, the mounting rod extending between the end plates;
    a spring removably disposed about the rod and located between a spacer and one of either the first or second end plates; and
    means removably attached to one end of the rod for inhibiting the spacers from sliding off the rod.

2. A fixture according to claim 1 further comprising a second spring removably disposed about the rod and located between a spacer and the other of the first or second end plates.

3. A fixture according to claim 1 wherein there are a plurality of mounting rods extending between the first and second end plates.

4. A fixture according to claim 3 wherein the mounting rods are spaced equidistantly apart from one another, the fixture further comprising a central rod extending between and adjustably spacing the end plates apart form one another.

5. A fixture according to claim 2 wherein the spacers are made from ultra-high molecular weight polyethylene material.

6. A fixture according to claim 2 wherein the spacers have a height of approximately 2 inches.

7. A fixture according to claim 2 wherein the tools are circular saw blades, wherein the end plates have a diameter of approximately 9 inches and are made from a polyurethane material, wherein the spacers are made from polyethylene material and have a length of approximately 2 inches, and wherein the rod is attached so as to produce a compression force on the blades greater than approximately 25 lbs.

8. A fixture for removably holding tools to be processed in a rotational processing apparatus having a vessel and a drive system capable of simultaneously rotating the vessel about two separate axes of rotation, the processing intended to surface finish the tools, the fixture comprising:
    at least one mounting rod;
    a plurality of spacers capable of being slidably installed on the mounting rod;
    a plurality of tools capable of being installed on the rod, each tool being spaced from an adjacent tool by at least one of the spacers;
    first and second end plates, the end plates having a radial dimension that is at least the same as a radial dimension of the tools so that the tools do not protrude radially past the end plates, the mounting rod extending between the end plates;
    a spring removably disposed about the rod and located between a spacer and one of either the first or second end plates; and
    a fastener removably attachable to each end of the rod for preventing the spacers, spring, and tools from sliding off the rod,
    wherein the fixture is adapted to be disposed within the vessel without being attached to the vessel so that the fixture is capable of floating freely within and relative to the vessel when the vessel is rotated about the two separate axes of rotation.

9. The fixture according to claim 8, each of the plurality of tools having an outermost radial peripheral extent and the plates having an outermost radial peripheral extent at least equal to the outermost radial peripheral extent of each of the plurality of tools.

10. The fixture according to claim 8, wherein each of the plurality of spacers has at least one inwardly tapered end.

* * * * *